United States Patent [19]  [11] Patent Number: 4,527,423
Sato et al.  [45] Date of Patent: Jul. 9, 1985

[54] AIR FLOW METER FOR INTERNAL-COMBUSTION ENGINE

[75] Inventors: Kanemasa Sato; Sadayasu Ueno; Yoshishige Oyama; Yutaka Nishimura, all of Katsuta, Japan

[73] Assignee: Hitachi, Ltd., Tokyo, Japan

[21] Appl. No.: 461,556

[22] Filed: Jan. 27, 1983

[30] Foreign Application Priority Data

Feb. 8, 1982 [JP] Japan .................. 57-17511

[51] Int. Cl.³ .......................... G01M 15/00
[52] U.S. Cl. .................................... 73/118
[58] Field of Search ............. 123/472, 480, 488, 478; 73/118, 204

[56] References Cited

U.S. PATENT DOCUMENTS 3,747,577  7/1973  Mauch et al. ............. 73/202 X
3,824,966  7/1974  Schneider et al.
4,264,961  4/1981  Nishimura et al. ............. 364/510
4,420,972  12/1983  Kuroiwa et al. ...................... 73/118

Primary Examiner—Jerry W. Myracle
Attorney, Agent, or Firm—Antonelli, Terry & Wands

[57] ABSTRACT

Air flowing through an air cleaner is passed through a main passage and drawn into an internal-combustion engine, with a part of the air flowing through the main passage flowing into a by-pass passage having an air flow sensor mounted therein. A length of the by-pass passage is substantially three or more times longer than that of a part of the main passage corresponding thereto. Accordingly, even when the internal-combustion engine is operated with a throttle nearly totally open and the air in the main passage is pulsated, the average flow rate in the by-pass passage increases due to the inertial lag effect obtained by lengthening the by-pass passage, so that it is possible to prevent the output of the flow sensor from being undesirably lowered.

13 Claims, 21 Drawing Figures

AIR FLOW METER FOR INTERNAL-COMBUSTION ENGINE

BACKGROUND OF THE INVENTION

The present invention relates to an air flow meter usable for measuring the flow rate of intake air supplied to an internal-combustion engine of an automobile or the like.

DESCRIPTION OF THE PRIOR ART

In, for example, U.S. Pat. Nos. 3,747,577, 3,750,632, and 3,829,966, various arrangements are proposed for measuring the flow rate of intake air supplied to an internal-combustion engine in the form of heat-sensitive air flow meters, such as hot-wire air flow meters which are generally excellent in responsiveness and also capable of measuring the mass flow rate. These known heat-sensitive air flow meters are arranged such that as a flow rate sensing part a platinum wire with a diameter of from 70 μm to 100 μm is stretched inside an intake pipe. However, disadvantages of these proposed arrangements reside in the fact that they have a relatively low durability and can easily be mechanically damaged by a backfire occurring particularly when the internal-combustion engine is in a bad condition.

To avoid the above noted disadvantages, U.S. Pat. No. 4,264,961, proposes an arrangement wherein a part of the air passing through an intake pipe is introduced into a by-pass pipe, in which a platinum wire is mounted. However, a disadvantage of this proposed arrangement resides in the fact that the binary problem arises, namely, a phenomenon that a heat-sensitive air flow meter indicates the same output value although the flow rates of intake air differ from each other. This binary problem arises in the full-load operation range of an internal-combustion engine.

An object of the present invention is to provide a by-pass type air flow meter having no binary problem.

To this end, according to the invention, the length of a by-pass passage is made three or more times longer than that of a part of a main passage corresponding to the by-pass passage.

DETAILED DESCRIPTION OF THE INVENTION

Figure 1:
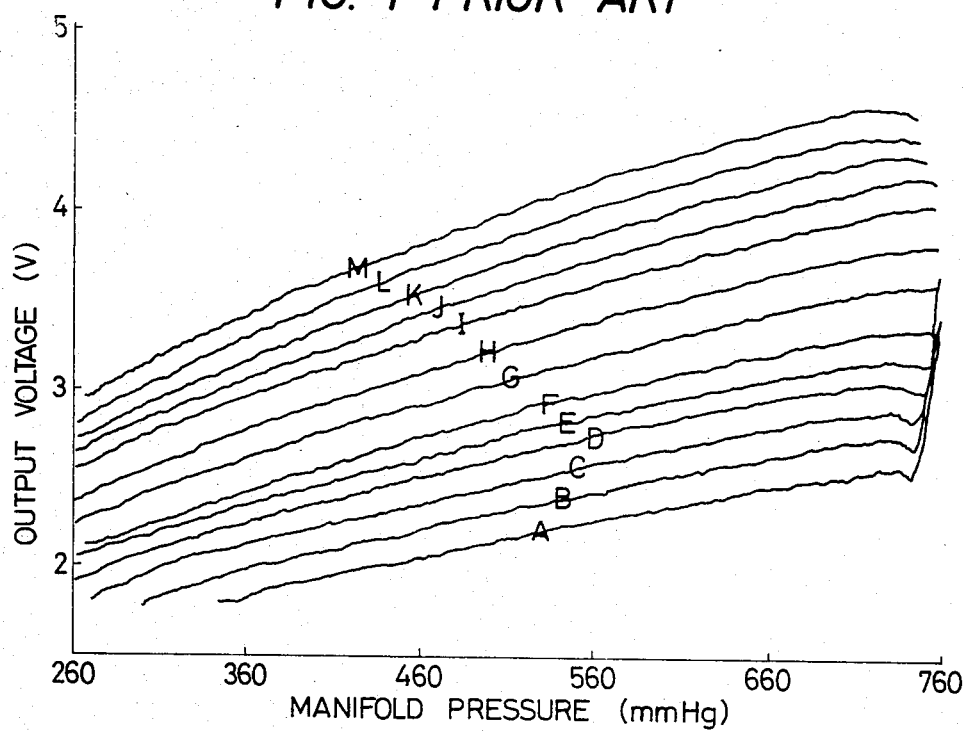
FIG. 1 is a characteristic graph showing the relationship between the manifold pressure and the output voltage in a conventional heat-sensitive air flow meter.

Referring now to the drawings wherein like reference numerals are used throughout the various views to designate like parts and, more particularly, to FIG. 1, as apparent from this figure, the manifold pressure, represented by the horizontal axis, substantially corresponds to the throttle opening. Consequently, the higher the manifold pressure, the larger the throttle opening. Moreover, the curves in FIG. 1 show characteristics at constant engine speeds, respectively: the curve A at 1000 RPM; the curve B at 1200 RPM; the curve C at 1400 RPM; the curve D at 1600 RPM; the curve E at 1800 RPM; the curve F at 2000 RPM; the curve G at 2400 RPM; the curve H at 2800 RPM; the curve I at 3200 RPM; the curve J at 3600 RPM; the curve K at 4000 RPM; the curve L at 4400 RPM; and the curve M at 4800 RPM.

In FIG. 1, the characteristic curves have a tendency to droop in the shape of the elephant trunk in the regions close to the totally open state of the throttle, particularly at low speed, from 1000 RPM to 2000 RPM and at high speed, above 4000 RPM. Consequently, there is a binary problem that the values of output voltage (V) of the flow sensing signal are the same although manifold pressures, i.e., intake air flow rates are different from each other.

Figure 2:
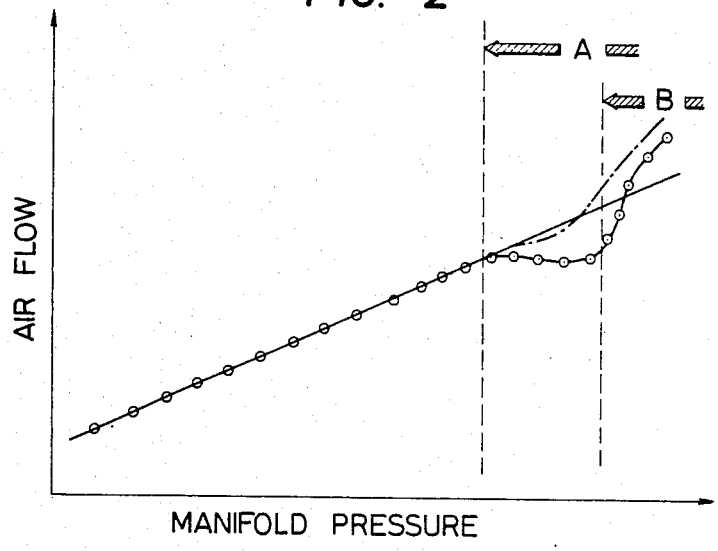
FIG. 2 is a graphical representation of the relationship between the manifold pressure and the output voltage in the air flow meter shown in FIG. 1.

Such a binary problem leads to a large error in the intake air flow rate sensing signal so that it becomes impossible to effect an accurate engine control. As apparent from FIG. 1, as the throttle opening becomes larger and the manifold pressure becomes higher, intake pulsations are generated. In FIG. 2, the zone A includes regions where intake pulsations are noticeably generated, while the zone B includes regions where blow-back takes place particularly remarkably in the intake pulsation regions. Assuming that the straight line shown by a solid line is a real air flow line, the air flow obtained from the output of a heat-sensitive probe shows a characteristic illustrated by a series of circles. In the zone A, the output signal of the heat-sensitive probe showing the air flow lowers, causing a larger error. Moreover, in the zone B, affected by the blow-back, the output signal becomes larger than the real value, leading to a positive error.

Figure 3:
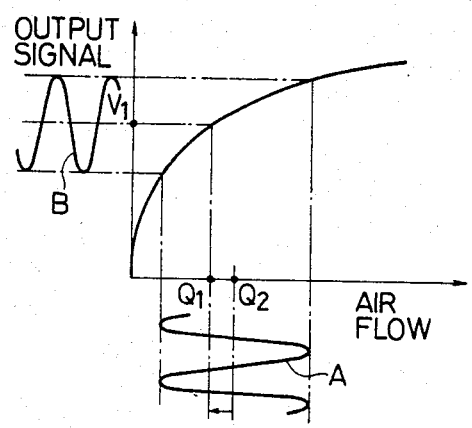
FIG. 3 is a graphical illustration of a non-linear relationship between the air flow and the output signal of a prior art construction.

In FIG. 3, the air flow passing through the air flow meter is a pulsating flow shown by a solid line A, with the output signal of the flow meter varied as shown by a solid line B. Consequently, when the output signal is averaged per period of the pulsation and an air flow $Q_1$ is obtained from the averaged signal $V_1$, the air flow $Q_1$ is smaller than an average value $Q_2$ of the real air flow. As a result, the relationship between the real air flow and the air flow (measured value) obtained from the above-mentioned averaged value in case of varying the intake pipe pressure under a condition of a constant engine speed is such as shown in FIG. 2. Namely, in engine operation regions where the intake pulsation has a large pulsation amplitude, measured values become smaller than real air flows, leading to large measuring errors.

If the average air flow rate is denoted by $U_0$, while the amplitude of the pulsating flow is designated by A, the flow rate U of the pulsating air flow is represented by the following formula:

$$U = U_0(1 + A \cdot \sin wt) \quad (1)$$

Figure 4:
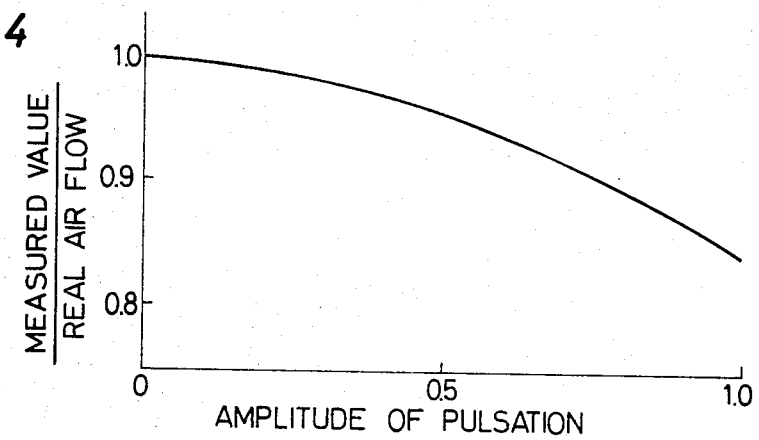
FIG. 4 is a graphical illustration of a computer simulation of the problems encountered with the prior art construction.

As shown in FIG. 4, when the amplitude ratio A is 1, the amplitude is maximum. When the ratio is 1, the real air flow and the measured value coincide with each other. It will be understood that the larger the amplitude of pulsation A, the smaller the measured value than the real value, causing an increase in the measuring error.

Figure 5:
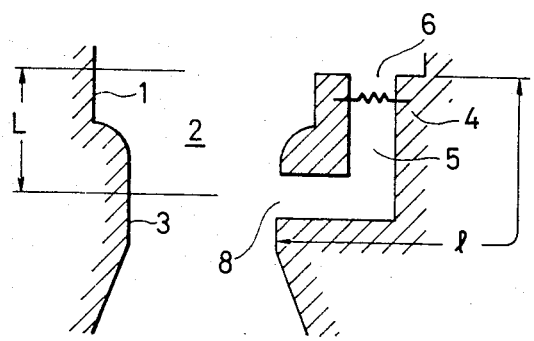
FIG. 5 is a schematic cross-sectional view of an arrangement constructed in accordance with the present invention.

As shown in FIG. 5, according to the present invention, a heat-sensitive probe 4 is disposed in a by-pass passage 5 formed in a slot body 1, with the by-pass passage 5 having an inlet 6 provided on the upstream side of a venturi part 3 of a main intake passage 2 and an outlet 8 provided at the venturi part 3. If the pressure at the inlet 6 is denoted by $p_1$, and the pressure at the outlet 8 is designated by $p_2$, the pressure difference $p_1 - p_2$ produced when intake pulsation is generated is represented by the following formula:

$$p_1 - p_2 = L \cdot \rho \frac{du_2}{dt} + \epsilon \cdot \rho \frac{U_2^2}{2} + \left\{1 - \left(\frac{A_2}{A_1}\right)\right\} \rho \cdot u_2^2 \quad (2)$$

where:
L is the length of a part of the main intake passage 2 corresponding to the by-pass passage;
$\rho$ is an air density;
$\epsilon$ is a frictional loss coefficient;
$A_1$ is the sectional area of the main intake passage at the venturi part 3;
$A_2$ is the sectional area of the by-pass passage 5; and
$u_2$ is the air flow rate in the main intake passage at a section 8.

On the other hand, the air flow rate w in the by-pass passage 5 resulting from the pressure difference $p_1 - p_2$ is represented by the following formula:

$$p_1 - p_2 = l \cdot \rho \frac{dw}{dt} + \epsilon \cdot \rho \frac{w^2}{2} \quad (3)$$

where:
l is the length of the by-pass passage.

It is to be noted that the first term on the right side of each of the above formulae (2), (3) represents an inertia of the air flow.

Figure 6:
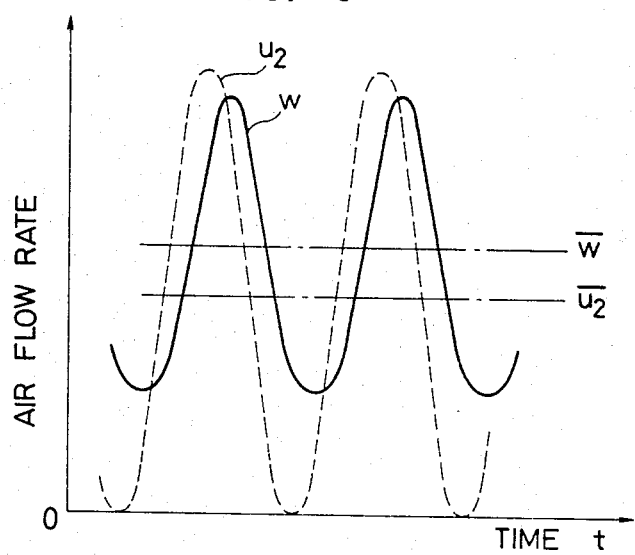
FIG. 6 is a graphical illustration of calculation results of an air flow rate in a by-pass passage with a sinesoidal variation of the air flow rate in the main intake passage.

As shown in FIG. 6, the amplitude of the air flow rate w, shown by a solid line, in the by-pass passage 5, with a sinusoidal varying of the air flow rate $u_2$, is decreased as compared with that of the flow rate $u_2$, shown by a broken line, because of an inertial lag effect. In addition, due to a venturi effect between the main intake passage at sections 6 and 8 in FIG. 5, i.e., the relationship shown by $p_1 - p_2 \propto u_2^2$, the average value $\overline{w}$ tends to be larger than $\overline{u_2}$.

Figure 7:
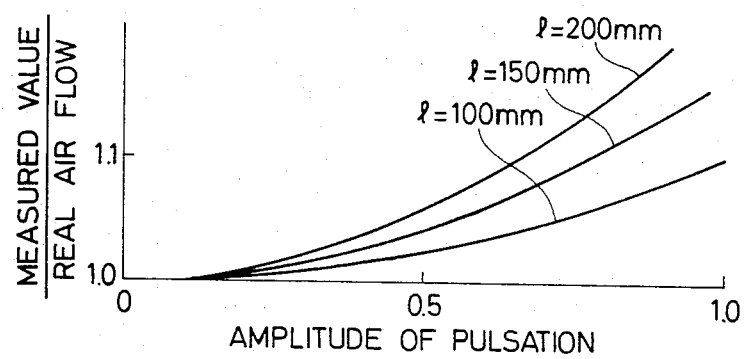
FIG. 7 is a graphical illustration of the relationship between the amplitude of pulsation and the ratio of the measured value over the real air flow.

As shown in FIG. 7, the larger the amplitude of pulsation A, and the larger the length l of the by-pass passage, the larger the by-pass passage average air flow rate than the main passage average air flow rate. In this case, the length of a part of the main passage corresponding to the by-pass passage is 30 mm.

Figure 8:
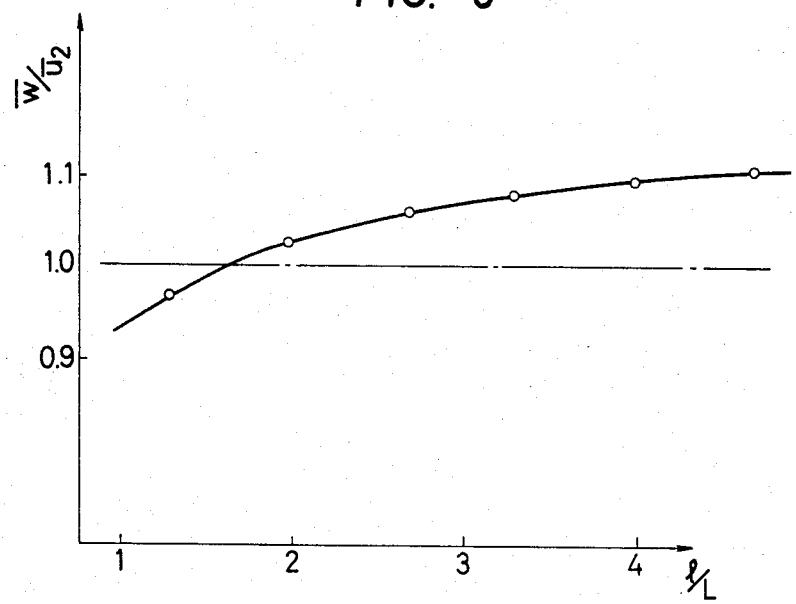
FIG. 8 is a graphical illustration of the characteristics obtained by virtue of the by-pass passage of FIG. 5.

In FIG. 8, the horizontal axis represents values of l/L, while the vertical axis represents values of $\overline{w}/\overline{u_2}$. In other words, by properly selecting l/L, it becomes possible to cancel the decrease in the flow meter output in the regions in the zone A of FIG. 2 where intake pulsation is noticeably generated, by the increase in the average flow rate in the by-pass passage due to the inertial lag effect.

Figure 9:
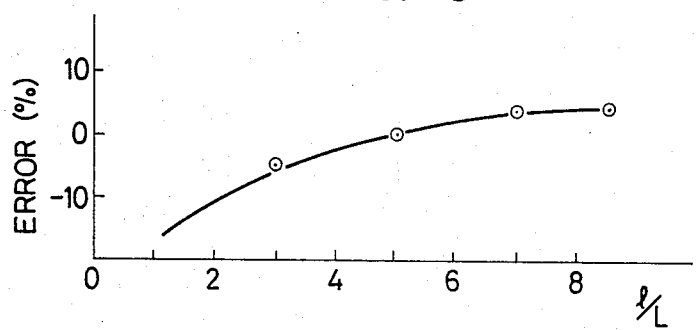
FIG. 9 is a graphical illustration of the relationship between the output air determined by the ratio of the by-pass passage length to the main passage length.

As shown in FIG. 9, output error, with respect to the ratio of the by-pass passage length l to the main passage length L, l/L, when the internal-combustion engine is operated at 1000 rpm with the throttle totally open is relatively small so that it can be practically neglected if the ratio of the by-pass passage length l to the main passage length L between the branching part and the combining part is three or more.

In other words, when the ratio is three, the error is $-5\%$, and such a small error will not cause a binary problem although the measured value is smaller than the actual air flow as shown by a dash and dotted line in FIG. 2. When the ratio is five or more, the error becomes positive. However, a positive error will not cause a binary problem, since in such a case the measured value is larger than the actual air flow. It is to be noted that the measured value becomes larger than the actual air flow in the blow-back regions in the zone B in FIG. 2, as shown by a dash and dotted line, since the effect obtained by lengthening the by-pass passage is small in such regions.

Figure 10:
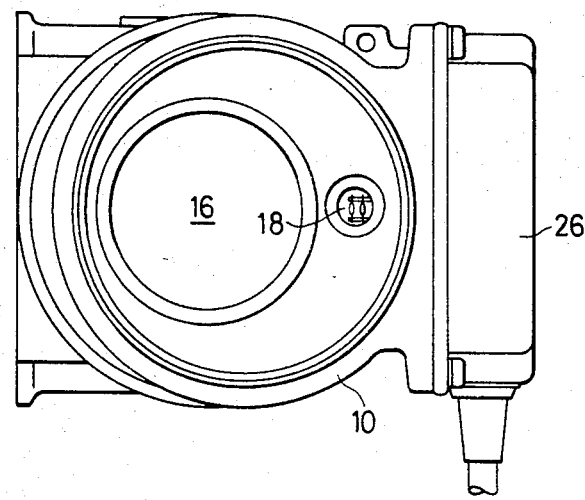
FIG. 10 is a plan view of one embodiment of the invention.
Figure 11:
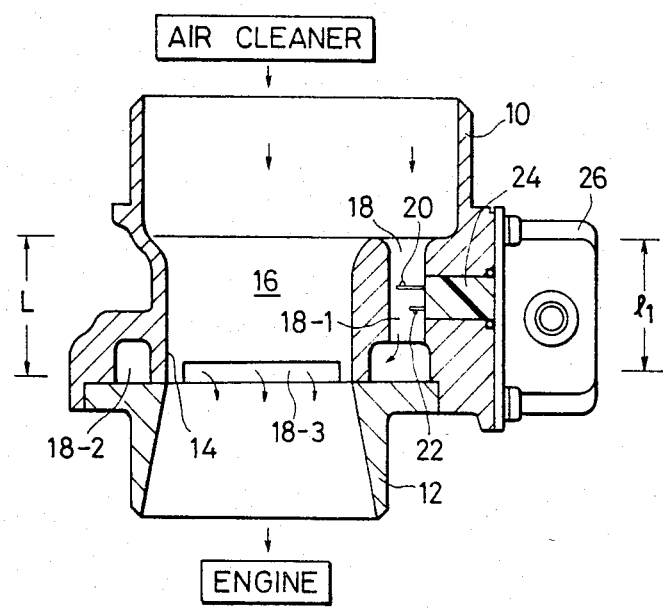
FIG. 11 is a partial cross-sectional side elevational view of the embodiment shown in FIG. 10.

As shown in FIG. 10, body part 10, made of die cast aluminum, has an air cleaner connected to an upstream side thereof, with a die cast aluminum skirt part 12 of having a downstream side thereof connected to an engine. The body part 10 and the skirt part 12 are secured to each other by fasteners such as, for example, bolts or four screws. A part of the inner wall of each of the body part 10 and the skirt portion 12 defines a venturi part 14. The body part 10 has a main passage 16 and a by-pass passage 18, which includes a rectilinear portion 18-1 disposed in parallel to the main passage 16 and a second curved by-pass portion 18-2 surrounding a periphery of the main passage 16. As will be apparent from FIG. 12, wherein the skirt part of FIG. 11 is removed, the curved portion 18-2 of the by-pass passage 18 surrounds about three-quarters of the periphery of the main passage 16. Moreover, as shown in FIG. 11, an outlet 18-3 of the by-pass passage 18 is formed into a slit which is long sideways. A heat-sensitive resistor 20, for measuring air flow, is disposed in the rectilinear portion 18-1 of the by-pass passage 18 and functions as a sensor. Additionally a heat-sensitive resistor 22 for compensating the air temperature is disposed in the by-pass passage 18, with the two heat-sensitive resistors 20, 22 being secured to support pins, extending through a heat insulating substance 24 and being connected to an electric circuit, the details of which are described hereinbelow, in a circuit case 26. The heat-sensitive resistors 20, 22 are, for example, fashioned as hot-wire or hot-film type resistors of the type disclosed in, for example, U.S. Pat. No. 4,264,961 wherein a platinum thin wire is wound on an alumina bobbin and coated with glass. On the other hand, it is also possible to provide hot-film type resistor of the type described, for example, in commonly assigned U.S. Pat. application Ser. No. 387,527, wherein a platinum thin film is formed on the surface of an alumina substrate and is subjected to a laser trimming for regulating the resistance value, and then the surface of the platinum thin film is coated with glass.

Figure 12:
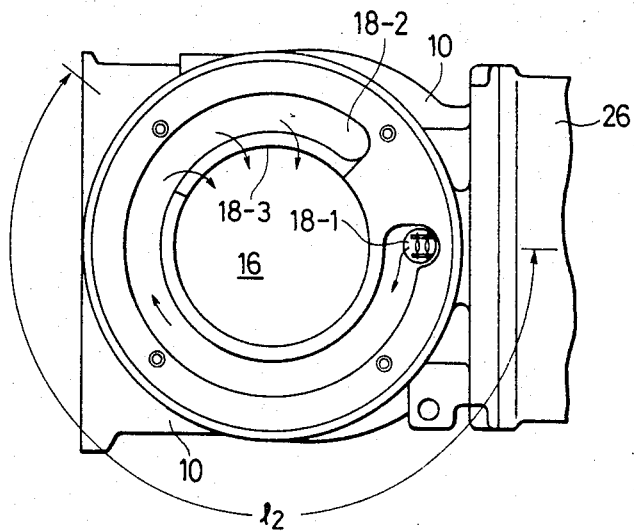
FIG. 12 is a partial cutaway bottom view of the embodiment shown in FIG. 10.

Dimensions of various parts of the embodiment shown in FIGS. 10 thru 12 are as follows:

$l_1$ of the rectilinear portion 18-1 of the by-pass passage 18=27.5 mm;

$l_2$ of the curved portion 18-2 of the by-pass passage 18=113 mm;

$l (=l_1+l_2)$ of the by-pass passage 18=140.5 mm;

L of a part of the main passage 16 corresponding to the by-pass passage 18=30 mm;

the ratio l/L of the length l of the by-pass passage 18 to the length, of the main passage 16=4.68;

the inside diameter of the narrowest portion of the venturi part 14 of the main passage 16=45 mm$\phi$;

the inside diameter of the narrowest portion of the rectilinear portion 18-1 of the by-pass passage 18=8 mm$\phi$;

the width of the curved portion 18-2 of the by-pass passage 18: 8 mm;

the height of the curved portion 18-2 of the by-pass passage 18: 9 mm;

the height of the outlet 18-3 of the by-pass passage 18: 4 mm; and the width of the outlet 18-3 of the by-pass passage 18: 55 mm The length $l_1$ of the rectilinear portion 18-1 is a distance between the center of the inlet of the by-pass passage 18 and the center of the connecting part of the rectilinear portion 18-1 and the curved portion 18-2 of the by-pass passage 18. The length $l_2$ of the curved portion 18-2 is a distance between the center of the above-mentioned connecting part and the center of an effective area of the outlet of the by-pass passage 18. In the illustrated embodiment, the effective area of the outlet of the by-pass passage 18 is 220 mm$^2$. On the other hand, the narrowest portion of the by-pass passage 18 is the position where the heat-sensitive resistors 20, 22 are disposed, and the area thereof is about 50 mm$^2$. Consequently, due to the effect of the narrowest portion, the area of about 50 mm$^2$ of the outlet of the by-pass passage 18 on the side closer to the inlet thereof is a practical effective area. Also the other portions more or less contribute for the outlet. Thus, the length l of the by-pass passage 18 is a distance between the center of the inlet of the by-pass passage 18 and the center of the effective area of the outlet.

The length L of a part of the main passage corresponding to the by-pass passage is determined in the following manner. Assuming two planes cross the flow of the air in the main passage at right angles, with one plane including the center of the inlet of the by-pass passage, an the other plane including the center of the outlet of the by-pass passage, the distance between these two planes is the length L of the main passage.

Figure 13:
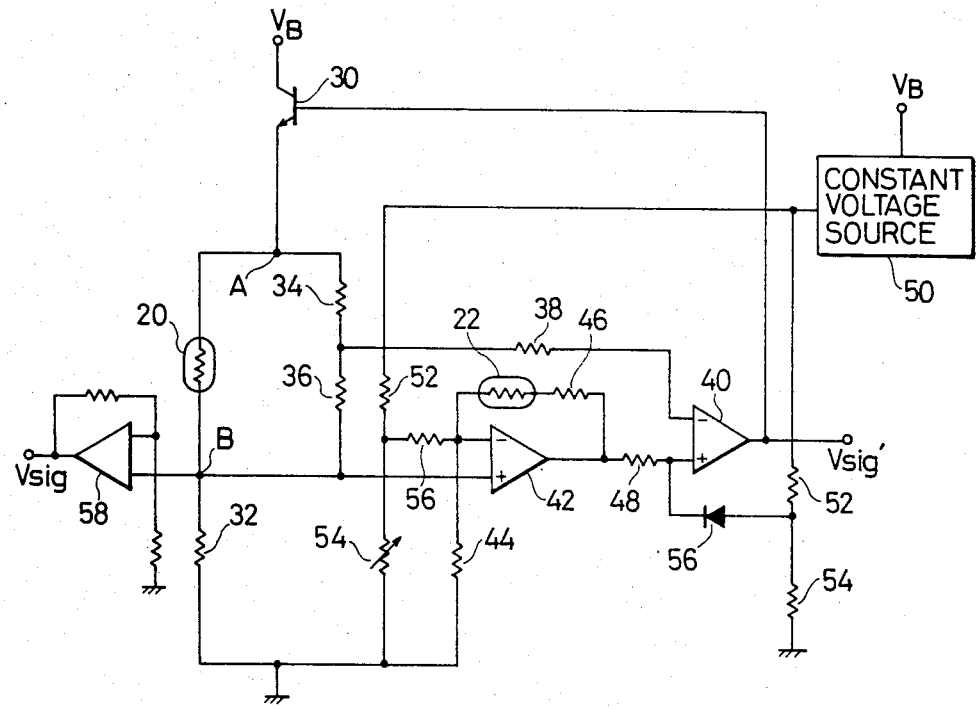
FIG. 13 is a circuit diagram of the embodiment shown in FIG. 10.

As shown in FIG. 13, a voltage $V_B$ from a power source such as, for example, an automobile battery, is supplied through a transistor 30 to the heat-sensitive resistor 20 for measuring the flow rate. A resistor 32 is connected in series with the heat-sensitive resistor 20, with the resistor 32 being employed for measuring the current flowing through the heat-sensitive resistor 20. The voltage across the heat-sensitive resistor 20 is divided by resistors 34 and 36, and the divided voltage is supplied through a resistor 38 to one input terminal of a differential amplifier 40. The negative input of an amplifier 42 is grounded through a resistor 44. The heat-sensitive resistor 22 for compensating temperature and a resistor 46 are feedback resistors of the amplifier 42, with an output of the amplifier 42 being connected, through a resistor 48, to the positive input of the amplifier 40. Accordingly, the amplifier 40 delivers an output so that the voltage across the heat-sensitive resistor 20, which is divided, is equal to the voltage obtained by amplifying the voltage at a connecting point B between the heat-sensitive resistor 20 and the resistor 32 with an amplification factor corresponding to the air temperature. The output of the amplifier 40 is supplied to the base of the transistor 30. The amplifier 40 delivers an output so as to equalize two inputs with each other, thereby controlling the transistor 30. As a result, the heat-sensitive resistor 20 is maintained at a constant temperature. The temperature is about 170° C. higher than the air temperature around the heat-sensitive resistors 20, 22. A series circuit comprising a resistor 52 and a variable resistor 54 is connected to a constant voltage source 50. The connecting point between the resistors 52 and 54 is connected through a resistor 56 to the negative input of the amplifier 42, with these resistors being employed for offset regulation. Moreover, the output of the constant voltage source 50 connected to the battery supplying the voltage $V_B$ is divided by the resistors 52, 54. The connecting point between the resistors 52 and 54 is connected through a diode 56 to the positive input of the amplifier 40. These are starting circuits or, in other words, when the key switch of the automobile is moved to the ON position, a constant voltage is applied through the diode 56, thereby making the two inputs of the amplifier 40 different from each other in order to force the amplifier 40 to deliver an output. The connecting point between the heat-sensitive resistor 20 and the resistor 32 is connected to an amplifier 58, which delivers the voltage across the resistor 32. Since the resistance value of the resistor 32 is constant, the output of the amplifier 58 represents the current flowing through the resistor 32, i.e., the current flowing through the heat-sensitive resistor 20, becoming an air flow signal. Also, the output of the amplifier 40 is proportional to the current flowing through the heat-sensitive resistor 20. Therefore, the air flow can be measured also by means of the output of the amplifier 40.

Figure 14:
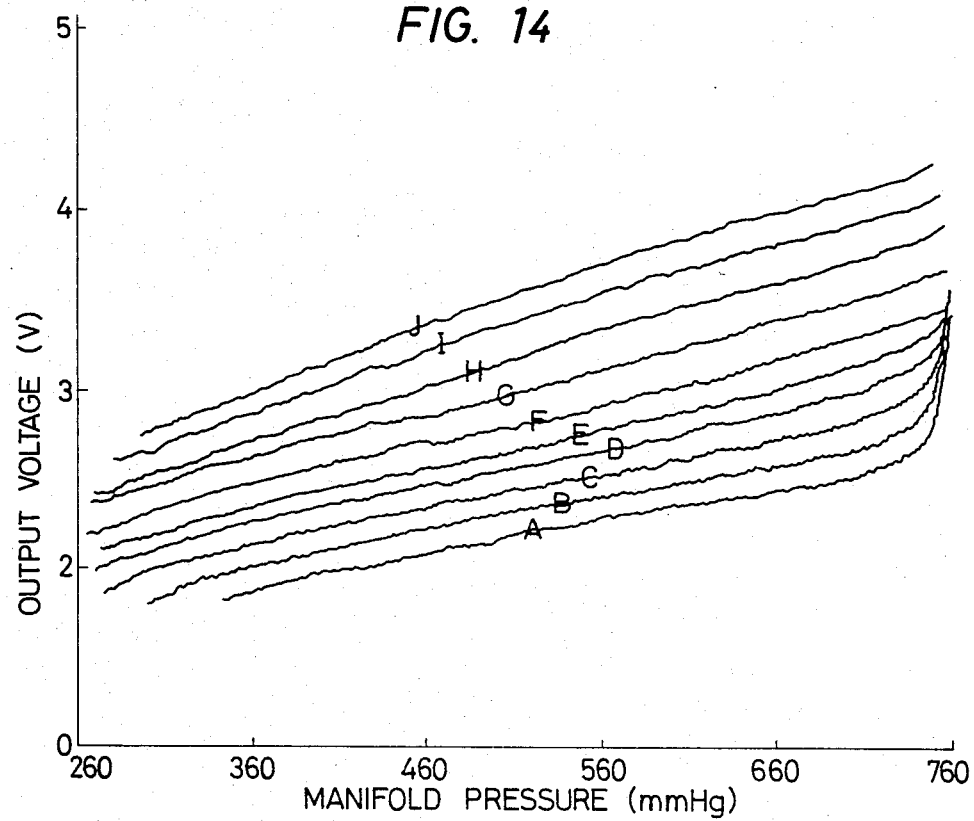
FIG. 14 is a graphical illustration of a relationship between the manifold pressure and the output voltage in the embodiment shown in FIG. 10.

FIG. 14 provides a graphical illustration of employing the heat-sensitive air flow meter for internal-combustion engines according to the invention shown in FIGS. 10 thru 12, corresponding to FIG. 1. In FIG. 14, characteristics of the outputs V of the flow sensing signals varying with the manifold pressure at various revolution numbers (curves A and J represent 1000 RPM and 3600 RPM, respectively, and characteristic curves therebetween represent revolution numbers intermediate therebetween respectively) can be all made to be monotonously increasing characteristics in the regions where the throttle is totally open, thereby completely resolving the binary problem. Thus, the flow sesnsing signal error is eliminated, and it is possible to effect an accurate engine control.

Figure 15:
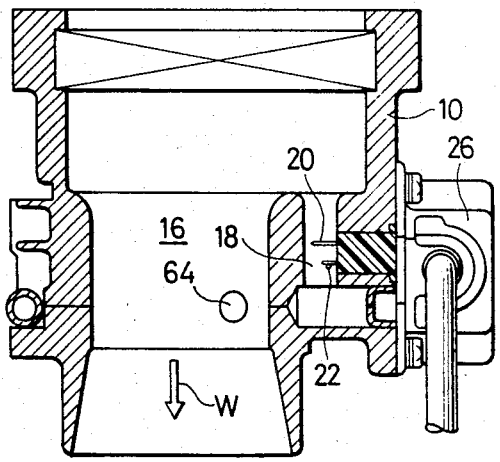
FIG. 15 is a partial cross-sectional side elevational view of another embodiment of the invention.
Figure 16:
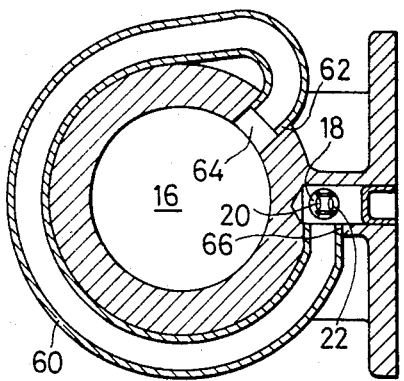
FIG. 16 is a partial cross-sectional plan view of the embodiment shown in FIG. 15.

In the embodiment of FIGS. 15 and 16 the parallel passage 18 is formed inside the side wall part of the main passage 16 so as to be parallel thereto. A pipe 60 forming an outer pripheral by-pass passage is connected to the lower end of the parallel by-pass passage 18. An outlet end 62 of the pipe 60 is connected to an opening 64 opened in the side wall of the main passage 16. In other words, an inlet end 66 of the pipe 60 is connected to the lower end of the parallel by-pass passage 18, and the pipe 60 is disposed so as to substantially surround all the periphery of the side wall part of the main passage 16 as well as combine with the main passage 16 again through the outlet end 62. In this embodiment, the portion corresponding to the outer peripheral by-pass passage 18-2 formed inside the main passage side wall part in the first-described embodiment is formed by the pipe 60 mounted on the outside of the main passage side wall part.

A part of the intake air flowing in through the air cleaner branches off and flows in from the inlet end of the parallel by-pass passage 18 and is passed through the heat-sensitive resistors 20, 22 before flowing into the pipe 60 forming the outer peripheral by-pass passage. After traveling substantially around the periphery of the main passage 16, the part of the intake air reenters the main passage 16 from the opening 64.

According to the above-described embodiments, it is possible to enlarge the inertia of the intake air flow in the by-pass passage, since the outer peripheral by-pass passage is connected to the downstream end of the parallel by-pass passage 18 parallel to the main passage 16 for lengthening the length of the by-pass passage. Therefore, even when intake pulsation is generated by the engine operation, it is possible to decrease the amplitude of the pulsation in the by-pass passage, thereby making it possible to maintain the state of flow relatively close to the steady flow. Thus, since the intake air flow in the by-pass passage, i.e., the flow in the passage where the heat-sensitive resistor 20 is disposed is close to the stationary state, thereby allowing the pulsation to be smaller, it is possible to decrease the responsive lag effect of the sensing signal representative of the flow sensed by the heat-sensitive resistor 20. Accordingly, it is possible to resolve the binary problem due to the above-mentioned responsive lag (particularly the responsive lag in rising), i.e., the binary problem based on that only an average flow lower than the actual flow can be sensed owing to the fact that the responsive lag becomes larger in rising although there is a small responsive lag in decaying.

Moreover, according to the above-described embodiments, since the outer peripheral by-pass passage 18-2 or the pipe 60 corresponding thereto is provided at the portion surrounding the main passage 16, all of the by-pass passage can be housed within the range of the heat-sensitive flow meter. Accordingly, it is possible to obtain a heat-sensitive flow meter for internal-combustion engines with a simple compact structure and having no binary problem.

In addition, in case of forming the by-pass passage by the by-pass passage parallel to the main passage and the by-pass passage formed on the outer periphery of the main passage as shown in the above-described embodiment, the length of the by-pass passage can be made substantially three or more times longer than that of the main passage by making the length of the outer peripheral by-pass passage two or more times longer than that of the parallel by-pass passage.

As will be apparent from the above description, according to the embodiments of the invention, the binary problem arising when pulsation is generated is resolved, and the characteristic such as shown by the dash and dotted line in FIG. 2 can be obtained. However, the measured value is larger than the actual flow in the blow-back regions in the zone B as shown by the dash and dotted line in FIG. 2.

Figure 17:
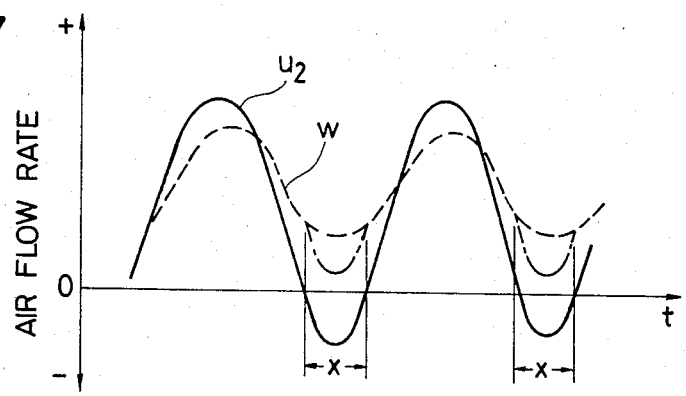
FIG. 17 is a graphical illustration of the flow rate of the air in a by-pass passage in a blow-back state.

In FIG. 17, a curve $u_2$, shown by a solid line, represents the intake air flow rate in the main passage at the outlet of the by-pass passage, while a curve w, shown by a broken line, represents the air flow rate in the by-pass passage 18. In a region x where a back flow is produced when blow-back occurs, even when the main passage air flow rate $u_2$ is negative, the air flow rate w in the by-pass passage, having an enlaged l/L is positive. Therefore, if such a method is employed that the waveform of w shown by the broken line is held from being positive as much as possible by applying the dynamic pressure of the back flow of the main passage air to the outlet of the by-pass passage in the regions x, the air flow rate in the by-pass passage approachs zero, so that it is possible to obtain a characteristic such as shown by a dash and dotted line. Thus, the dash and dotted line in the zone B in FIG. 2 further approaches ideal values shown by the solid line, thereby allowing the air flow rate error to be decreased.

Figure 18:
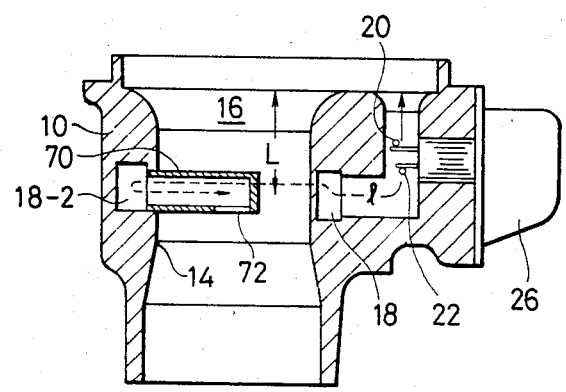
FIG. 18 is a partial cross-sectional side elevational view of still another embodiment of the invention.

As shown in FIG. 18 an outlet pipe 70 of the by-pass passage 18 is attached to the end of the annular passage 18-2 surrounding the half of the periphery of the Venturi part 14. The outlet pipe 70 is projected to the central part of the main intake passage 16 and has an outlet 72 formed in the lower surface thereof, thereby increasing the length l of the by-pass passage 18. As a result, the distance l between the inlet and the outlet 72 of the by-pass passage 18 is three to four times longer than the distance L of the main intake passage 16 between both ends of the by-pass passage 18. Accordingly, the above-mentioned inertial lag effect is applied to the by-pass passage air flow and moreover, since the outlet 72 of the by-pass passage 18 is opened in such a direction that the dynamic pressure of a back flow is applied thereto, the forward flow of the by-pass air flow produced when blow-back takes place is suppressed, thereby allowing the measuring error to be decreased.

Figure 19:
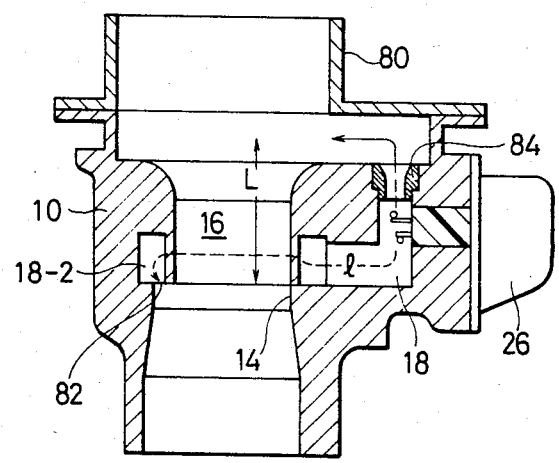
FIG. 19 is a partial cross-sectional side elevational view of a further embodiment of the invention.

In the embodiment of FIG. 19 an outlet 82 of the curved portion 18-2 of the by-pass passage 18 receives a dynamic pressure. Accordingly, the mechanical strength is higher than the embodiment shown in FIG. 18 wherein the outlet pipe 70 is projected in the main passage. Moreover, a bellmouth 84 is inserted in the inlet of the by-pass passage 18 for settling the air introduced in the by-pass passage 18. Further, a cap part 80 is mounted on the upstream side of the body part 10. The cap part 80 functions so that the air taken in through the air cleaner is not directly introduced into the by-pass passage but taken therein by means of a static pressure. Thus, dust in the air is prevented from entering the by-pass passage.

Figure 20:
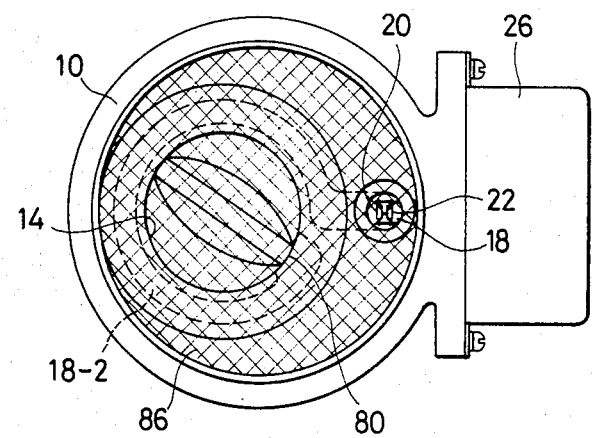
FIG. 20 is a plan view of a still further embodiment of the invention.
Figure 21:
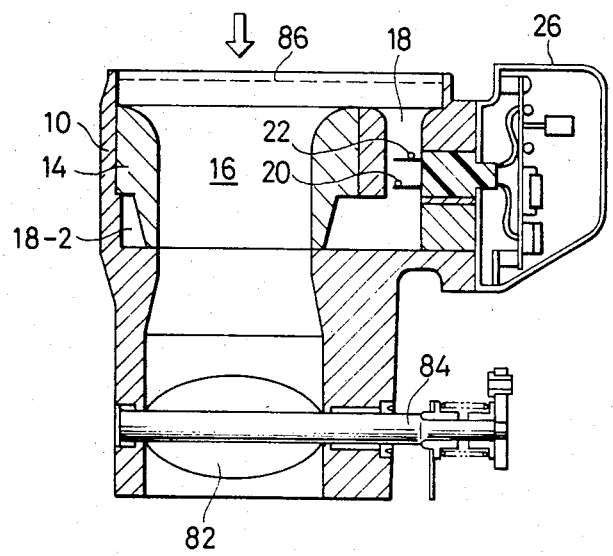
FIG. 21 is a partial cross-sectional side elevational view of the embodiment shown in FIG. 20.

In the embodiment of FIGS. 20 and 21, a heat-sensitive air flow meter and a throttle valve are formed into a unitary structure wherein the ratio between the air flow rates in the main and by-pass air passages is easily affected by the throttle valve opening, since the distance between the combining part 80 between the main and by-pass air passages and a throttle valve 82 is short. It is desirable for coping with this disadvantage to allow the direction of the by-pass passage outlet at the combining part 80 to coincide with the axial direction of a throttle valve shaft 84.

Moreover, a wire mesh 86 for preventing the entry of dust is provided on the upstream side of the main air passage and the by-pass air passage. In a by-pass type flow meter, the length of the resistor 20 for measuring the flow rate is obliged to be short, since the diameter of the by-pass air passage is smaller than that of the main air passage. Further, if the inlet of the by-pass air passage 18 is opened in the direction of the air flow as illustrated, when, for example, a part of elements of the air cleaner peels off, it easily enters the by-pass air passage and may cover a part of the resistor 20. Since the length of the resistor 20 is short, even if only a part thereof is covered, there will be a large change in the signal obtained therefrom. Therefore, the flow meter with such an arrangement as illustrated needs at the inlet thereof the wire mesh for preventing the entry of dust. Although the mesh of the wire mesh should be as small as possible from the viewpoint of prevention of the entry of dust, as the mesh is made smaller, there is an undesirable large increase in the breathing resistance. Therefore, a required mesh is about the length of the resistor 20, and a mesh of from 0.5 to 2 mm is preferable.

As the electric circuit, besides the example shown in FIG. 13, it is also possible to employ such a bridge circuit such as disclosed, for example, in U.S. Pat. No. 3,747,577.

By virtue of the features of the invention, the binary problem in air flow meters for internal combustion engines is eliminated from the by-pass pipe type heat-sensitive air flow meter.

What is claimed is:

1. An air flow meter for an internal combustion engine having:
    a main passage provided between an air cleaner and the internal-combustion engine;
    a venturi provided in said main passage;
    a by-pass passage having an inlet from which a part of the air flowing through said main passage flows as well as an outlet provided at said venturi from which said part of the air flows out to said main passage; and
    a flow sensor provided in said by-pass passage for measuring the flow rate of the air flowing through said by-pass passage,
    wherein the inlet opens parallel to longitudinal axis of said main passage and the outlet is located downstream of the flow sensor and said by-pass passage has a length relative to said main passage corresponding to said by-pass passage such that an average flow rate in the by-pass passage is increased so as to cancel a decrease in an output of the flow meter in regions wherein an intake pulsation is generated.

2. An air flow meter for internal-combustion engines as defined in claim 1,
    wherein said by-pass passage includes a rectilinear portion parallel to said main passage and a curved portion formed on the outer periphery of said main passage.

3. An air flow meter for internal-combustion engines as defined in claim 2,
    wherein said by-pass passage is formed in a member constituting said main passage.

4. An air flow meter for internal-combustion engines as defined in claim 3,
    wherein said member constituting said main passage is composed of at least two members,
    one of said two members having therein a portion of said main passage and said rectilinear portion of said by-pass passage,
    the other having the rest of said main passage,
    at least one of said two members having a groove formed on the outer periphery of said main passage, so that connecting said two members together permits said curved portion of said by-pass passage to be formed at the connecting part between said two members.

5. An air flow meter for internal-combustion engines as defined in claim 1,
    wherein said outlet of said by-pass passage is adapted to receive the air flowing from said internal-combustion engine by means of a dynamic pressure.

6. An air flow member for internal-combustion engines as defined in claim 1,
    wherein said by-pass passage is adapted to take in the air flowing in through said air cleaner by means of a dynamic pressure.

7. An air flow meter for internal-combustion engines as defined in claim 1,
    wherein said by-pass passage is adapted to take in the air flowing in through said air cleaner by means of a static pressure.

8. An air flow meter for internal-combustion engines as defined in claim 1,
    wherein the length of said by-pass passage is a distance between the center of said inlet of said by-pass passage and the center of an effective area of said outlet of said by-pass passage, and wherein the length of said main passage is a distance between a plane perpendicular to the flow of the air in said main passage as well as including the center of said inlet of said by-pass passage and a plane perpendicular to the flow of the air in said main passage as well as including the center of said outlet of said by-pass passage.

9. An air flow meter for internal combustion engines having:
    a main passage provided between an air cleaner and the internal combustion engine;
    a venturi provided in said main passage;
    a by-pass passage having an inlet from which a part of the air flowing through said main passage flows as well as an outlet provided at said venturi from which said part of the air flows out to said main passage, said by-pass passage includes a rectilinear portion parallel to said main passage and a curved portion formed on the outer periphery of said main passage, said curved portion of said by-pass passage is formed by means of a pipe different from said member constituting said main passage; and a flow sensor provided in said by-pass passage for measuring the flow rate of the air flowing through said by-pass passage, wherein a ratio of the length l of said by-pass passage to the length L of a part of said main passage corresponding to said by-pass passage, l/L is substantially three or more.

10. An air flow meter for an internal combustion engine having;
   a main passage provided between an air cleaner and the internal combustion engine;
   a venturi provided in said main passage;
   a by-pass passage having an inlet from which a part of the air flowing through said main passage flows as well as an outlet provided in said venturi from which said part of the air flows out to said main passage, said outlet of said by-pass passage is adapted to receive the air flowing from said internal combustion engine by dynamic pressure, said by-pass passage includes a rectiliner portion parallel to said main passage, a curved portion formed on an outer periphery of said main passage, and a projecting portion projecting into said main passage, said outlet of said by-pass passage is formed in said projecting portion on the side of said internal combustion engine; and
   a flow sensor provided in said by-pass passage for measuring the flow rate of the air flowing through said by-pass passage, wherein a ratio of the length l of said by-pass passage to the length L of a part of said main passage corresponding to said by-pass passage, l/L, is substantially equal to three or more.

11. An air flow meter for internal combustion engines having:
   a main passage provided between an air cleaner and the internal combustion engine;
   a venturi provided in said main passage;
   a by-pass passage having an inlet from which a part of the air flowing through said main passage flows as well as an outlet provided at said venturi from which said part of the air flows out to said main passage;
   a flow sensor provided in said by-pass passage for measuring the flow rate of the air flowing through said by-pass passage; and
   a throttle valve disposed on a downstream side of said main passage and close to said outlet of said by-pass passage so that a direction of said outlet of said by-pass passage and the axial direction of said throttle valve coincide with each other; and
   wherein a ratio of the length l of said by-pass passage to the length L of a part of said main passage corresponding to said by-pass passage, l/L, is substantially equal to three or more.

12. An air flow meter for internal combustion engines having:
   a main passage provided between an air cleaner and the internal combustion engine;
   a venturi provided in said main passage;
   a by-pass passage having an inlet from which a part of the air flowing through said main passage flows as well as an outlet provided at said venturi from which said part of the air flows out to said main passage;
   a flow sensor provided in said by-pass passage for measuring the flow rate of the air flowing through said by-pass passage;
   means for preventing entry of dust is provided on the upstream side from said inlet of said by-pass passage; and
   wherein a ratio of the length l of said by-pass passage to the length L of a part of said main passage corresponding to said by-pass passage, l/L, is substantially equal to three or more.

13. An air flow meter for internal-combustion engines having:
   a main passage in which a flow rate periodically changes;
   a first by-pass passage in which air of a given percentage with respect to the air flowing in said main passage flows and which is parallel to said main passage;
   a second by-pass passage connected to said first by-pass passage and formed on the outer periphery of said main passage as well as having a length two or more times longer than that of said first by-pass passage; and
   a means for measuring the air flow provided in said first by-pass passage.

* * * * *